Dec. 17, 1957  H. W. HARRER  2,816,804
MATERIAL-TRANSFERRING AND UNLOADING APPARATUS
Filed March 26, 1956  3 Sheets-Sheet 3
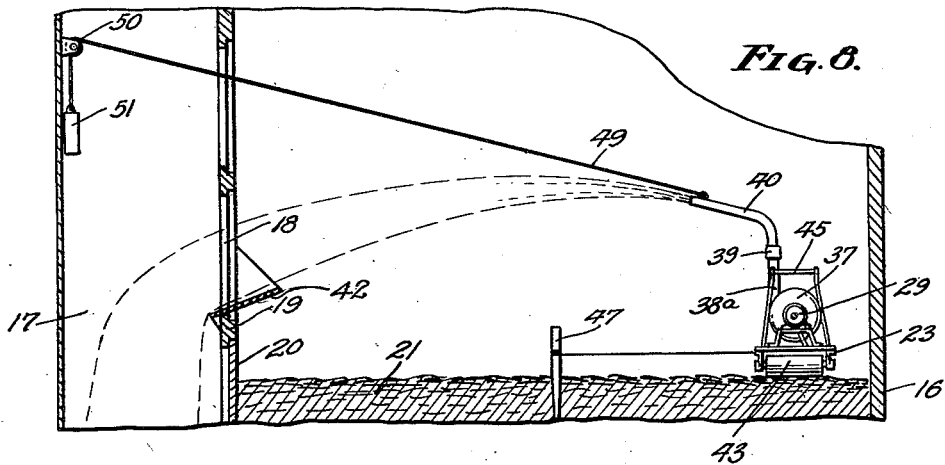
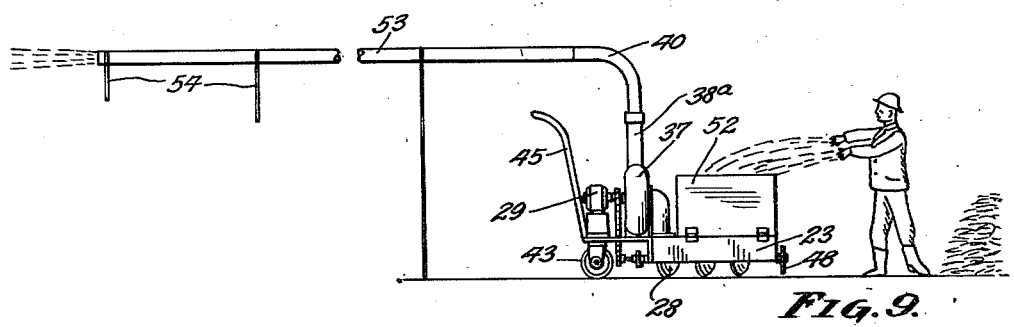
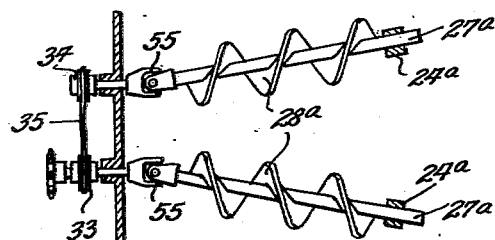
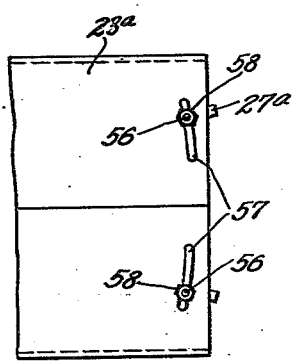
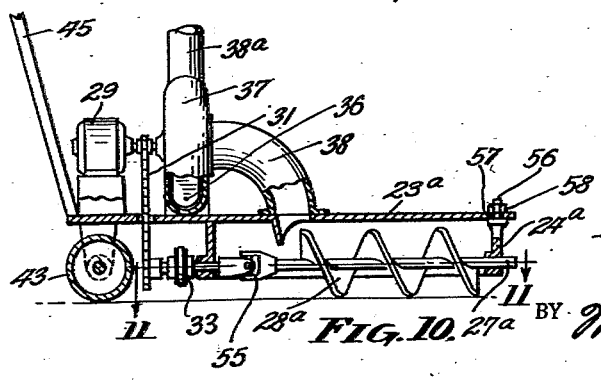
INVENTOR
*Herbert W. Harrer*
BY *M. S. Rambo*
ATTORNEY United States Patent Office 2,816,804
Patented Dec. 17, 1957

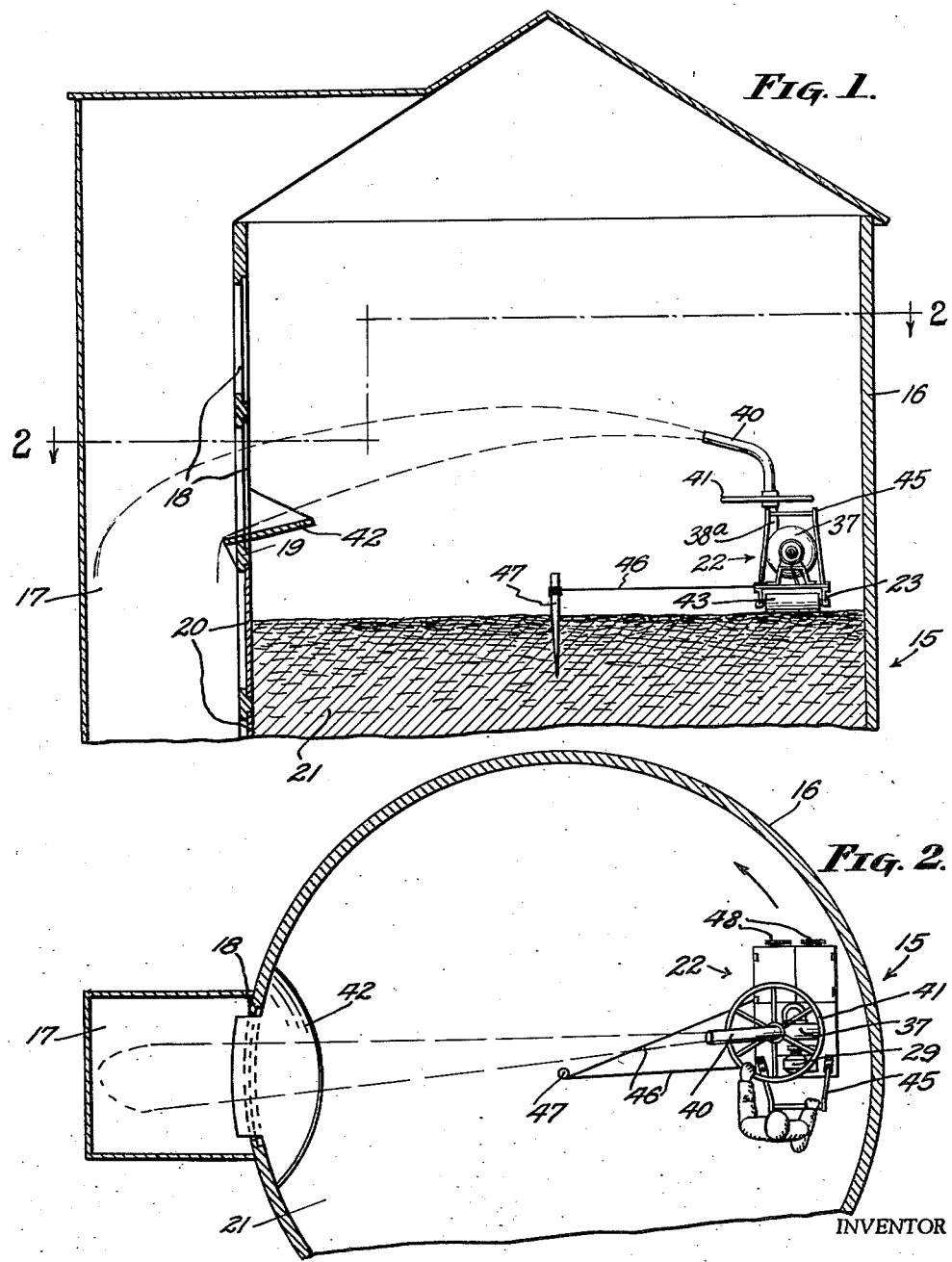

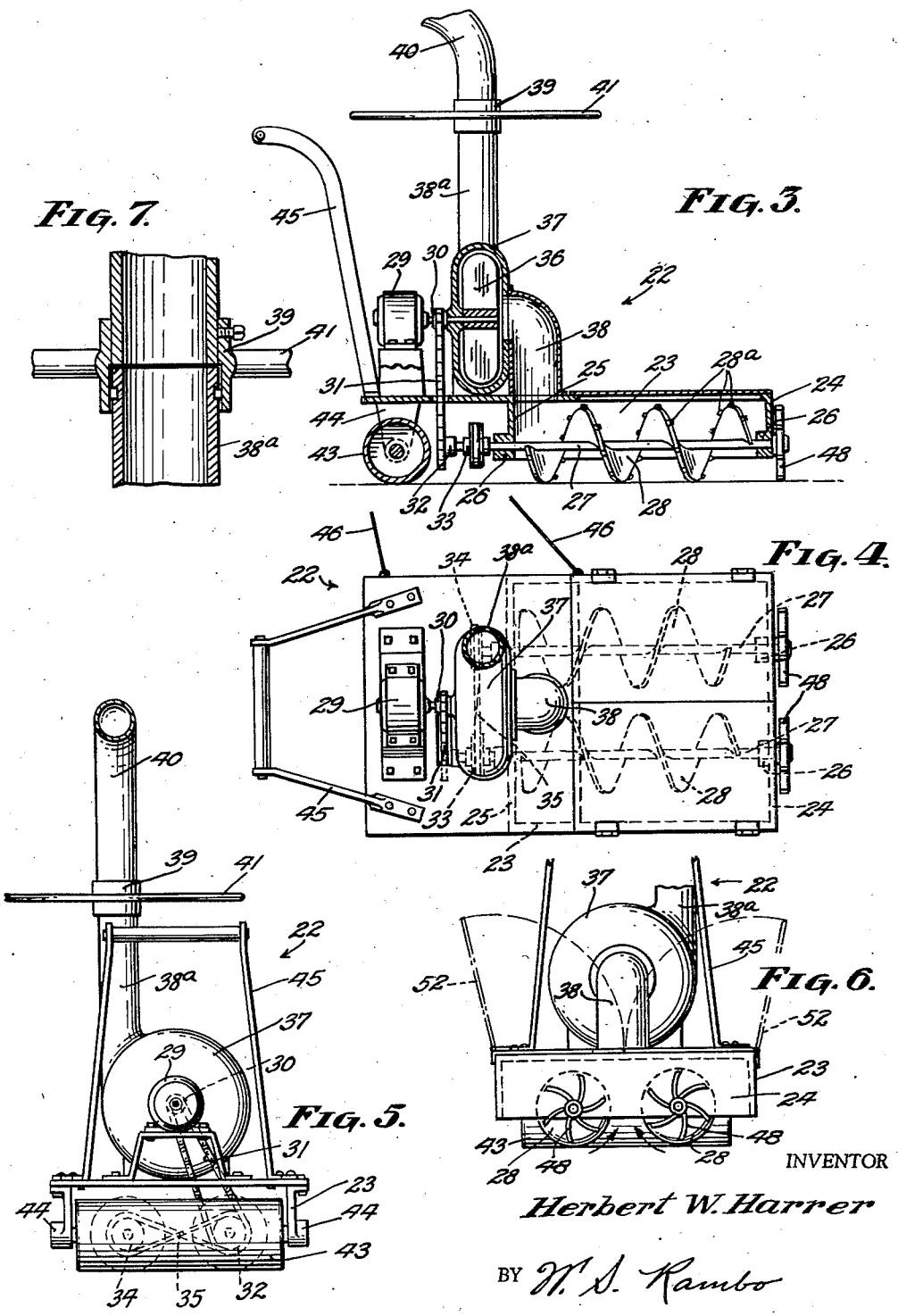

2,816,804

MATERIAL-TRANSFERRING AND UNLOADING APPARATUS

Herbert W. Harrer, New Washington, Ohio

Application March 26, 1956, Serial No. 573,871

6 Claims. (Cl. 302—56)

The present invention relates to an improved material-transferring or unloading apparatus and is particularly concerned with an improved portable or dirigible machine for unloading ensilage from silos or in the handling of hay, straw and other bulk materials in moving the same from one position to another.

In the mechanical unloading of ensilage from silos, apparatus heretofore employed for this purpose has been characterized by its relatively excessive weight, fixity, mechanical complexity and accompanying high costs. In the installation of such prior apparatus, it has been necessary to employ a construction crew in order to suspend the apparatus by cables or the like passing over especially constructed support members mounted within and adjacent the top of an associated silo, whereby to raise and lower the apparatus when ensilage is introduced into or removed from the silo. The resulting high cost of such apparatus and the installation expense necessary to mount the same in operative order within a silo, have been deterrent factors in limiting a wider employment thereof, although their usefulness, convenience and labor-saving properties are most desirable.

Accordingly, it is a leading object of this invention to provide a relatively low cost, manually controlled, power-actuated and freely portable unloading machine for conveniently and efficiently removing ensilage from the top of a column thereof contained in silo, and wherein the machine is constructed so that it is entirely self-contained and does not require the use of silo-mounted supporting means in its operative use within a silo.

In carrying out the present invention, my improved unloader provides a portable frame having rotatably mounted in the forward part thereof, in adjoining, horizontally disposed parallel order, a plurality of screws or auger-type conveyors which are driven by motor-actuated means carried by the frame. The conveyors are so mounted and operated as to engage directly the top of ensilage columns for producing frame propulsion thereover, the revolving conveyor blades thereof serving to cut, free and remove compacted ensilage and advance the same in a freed condition and linear course of travel between the conveyors rearwardly of the machine, enabling such ensilage to be drawn by suction forces into the throat of a frame-mounted motor-driven blower. By the use of the blower, ensilage handled thereby is forcibly blown or ejected from the outlet thereof through a swiveled discharge spout and directed into a stationary vertical drop or discharge chute forming a conventional part of the silo wall structure, the chute being arranged coextensively of the silo at one side thereof for the confinement and gravitational descent of the ensilage. The swiveled mounting of the discharge spout enables the ensilage discharged therefrom to be directed into the chute from any operative position in which the unloader may be disposed during manually directed, conveyor-produced maneuvering within the silo confines.

Other objects, advantages and constructional features of my improved unloader will be apparent from the following description and the accompanying drawings, in which similar characters of reference indicate like and corresponding parts throughout the several views.

In the drawings:

Fig. 1 is a vertical sectional view of an ensilage-storing silo, disclosing its discharge chute and associated door-closed access openings, and further disclosing in rear elevation the unloading machine of the present invention when in operation on the top of an ensilage column;

Fig. 2 is a horizontal sectional view taken substantially on the plane indicated by the line 2—2 of Fig. 1;

Fig. 3 is a vertical longitudinal sectional view taken through the unloading machine and disclosing one of its rotary conveyor screws and the associated motor-driven suction fan or blower;

Fig. 4 is a top plan view of the machine;

Fig. 5 is a rear elevational view thereof;

Fig. 6 is a front elevational view of the same;

Fig. 7 is a detail vertical sectional view of the swiveled connection between the adjoining ends of the motor-driven blower outlet and the turnable discharge spout;

Fig. 8 is an elevational view, partly in vertical section, disclosing a modified form of the invention wherein a weighted cable is utilized to maintain the outlet end of the swiveled discharged spout facing toward a silo drop chute opening during changes in position of the unloading machine relative to the opening;

Fig. 9 is a side elevational view disclosing the unloading machine with its frame doors elevated to permit of top loading of the conveyor screw; and further disclosing the outlet end of the swiveled discharge spout joined with an extension conduit for remote delivery of materials transferred by the operation of the machine;

Fig. 10 is a view mainly in vertical longitudinal section disclosing a further modified form of my improved loading machine in which the conveyor screws are mounted in a manner permitting of angular variation in the relative operating positions of the screw;

Fig. 11 is a horizontal sectional view taken on the line 11—11 of Fig. 10;

Fig. 12 is a detail view of the arcuate bearing adjustment means for the angularly separable conveyor screws of Figs. 10 and 11.

Referring to Fig. 1, the numeral 15 indicates a silo which has a cylindrical wall 16, the latter being formed on one side thereof with a vertically extending, outwardly projecting drop chute 17 disposed in communication with a plurality of openings 18 provided in a framing 19, positioned in the wall 16, removable door boards 20 being fitted in each of the openings. A column of ensilage is indicated at 21 and disposed for operation on the top of this column is the unloading machine 22 of the present invention.

In one of its presently preferred embodiments, the unloading machine comprises a substantially rectangular, open-bottomed frame 23 having transversely extending front and rear members 24 and 25, respectively. These members are formed to provide longitudinally aligned bearings 26 for the reception and rotatable support of the axially disposed journalling shafts 27 of a plurality of auger-type conveyor screws 28. In this instance a pair of such screws, disposed in parallel order, has been shown, but it will be understood that any desired number thereof may be used. If desired, the outer edges of the helical blades of the screws may be provided with teeth 28a in order to facilitate penetration of the blades into a compacted or frozen mass of the material to be gathered. The screws 28 are of such diameter as to extend through and below the open bottom of the frame 23 for direct contact with the ensilage.

The conveyor screws are driven so that they rotate in opposite directions and the pitch of their blades is such as to cause the ensilage displaced from the top of the column 21 by their rotating action to be advanced longitudinally and rearwardly of the machine between the screws. Also, the screws serve, because of the depth of penetration thereof into the material being unloaded, to impart propelling forces to the unloading machine, causing its forward advance over the top of the ensilage column.

A suitable drive for the conveyor screws may comprise an electric or other motor 29, the power shaft of which is equipped with a sprocket 30 driving an endless chain 31 and a second sprocket 32 fixed on one of the conveyor shafts 27. The shaft carrying the sprocket 32 is also provided with a belt wheel 33 disposed in transverse alignment with a corresponding wheel 34 and a crossed endless belt 35 is trained over the wheels 33 and 34, as shown in Fig. 5, to produce reverse or opposite rotation of the conveyor screws.

The motor shaft may be directly coupled with the shaft of a blower fan or rotor 36 mounted for rotation in a blower casing 37, the latter including an inlet conduit 38 which opens at a position in suction-producing communication with and between the rear ends of the conveyor screws 28, so that ensilage or other material advanced rearwardly by the screws may be caught in the blower suction and lifted into the casing 37, when, by the centrifugal action of the revolving rotor 36, said materials will be forcibly discharged through the exhaust or discharge conduit 38a, to a desired position of discharge or deposit.

In the construction illustrated, the blower exhaust conduit, as shown in Fig. 7, provides at its upper end a seat upon which is mounted for swiveled turning movement a collar 39 carried by the lower end of an elbow-shaped discharge spout 40. The direction of material discharge from this spout is controlled, as shown in Fig. 1, by a hand wheel 41 forming a part of the collar, so that the operator of the machine may turn the chute as the operating positions of the unloader are varied, whereby to cause materials ejected from the spout to be blown or forced toward an opening 18 in the silo and thence into the chute 17. If desired, a downwardly sloping apron plate 42 may be detachably mounted to the door-board framing 19 to provide a wide receiving surface for at least a portion of the spout-ejected material and to thereby assist in guiding such material into the drop chute. The frame 23 is provided at the rear thereof with one or more rotatable traction wheels or rollers 43 journaled in frame-carried bearings 44. Above this wheel the frame carries an upwardly and rearwardly extending handle structure 45, which may be grasped by the machine operator in controlling the operational movement of the unloader. It will be noted that the wheel 41 is positioned relative to the handle structure so that it may be conveniently reached by the operator.

In the circular confines of a silo use may be made of a snubbing cable 46. This cable has end portions which are adapted to be secured at spaced points to the machine frame on its inner side with respect to the silo wall, as shown in Fig. 2. The opposite end of the cable is wrapped around and secured to a stake 47 driven into the center of the ensilage column, so that as the machine pursues a circular course of movement, as indicated by the arrow of Fig. 2, the end of the cable lines attached to the stake will wind about the latter in a manner causing the unloading machine to be drawn in an inward spiral toward the stake 47, thus rendering the machine easier to control.

The shafts 27 of the conveyor screws 28 may have their front ends, in advance of the frame member 24, equipped with ensilage-penetrating and lifting wheels 48, as shown in Fig. 6. These wheels revolve with the shafts 27 and serve to loosen tightly compacted or frozen ensilage in facilitating more effective operation on the part of the conveyor screws.

As shown in Fig. 8, in lieu of the hand wheel 41, the discharge end of the spout 40 may be maintained constantly and automatically in a direction facing toward a desired wall opening 18, by attaching a line 49 to the discharge end of the spout and extending the line so that it projects through an opening 18 in the silo wall 16 into the drop chute 17 for passage over a fixed guide sheave 50, the line extending downwardly from the chute in order that it may have a weighted body 51 suspended from its lower end. By the use of this construction, as the machine 22 is operated in the silo and its position constantly changed therein, the weighted line 49 will cause the spout 40 to always face toward the opening or openings 18, insuring thereby proper delivery of materials discharged from the spout into the drop chute of the silo.

My improved unloading machine is, of course, adaptable to the loading or transferring of various bulk materials, such as hay, straw and other farm roughage. Thus, as shown in Fig. 9, the conveyor screws 28 may be loaded from the top as well as from the bottom of the frame 23. Normally said frame carries a pair of hinged horizontal doors 52 which cover the open top of the frame and the conveyor screws, but when it is desired to load the machine from the top, these doors are raised to assume substantially upright positions, so that they may serve as hopper sides in directing the materials to be loaded downwardly into the machine for rearward advancement by the screws. In operations of this kind, it is often advantageous to dispose the spout 40 in communication with an elongated extension conduit 53 which may be retained in its horizontal operating position by the use of suitable vertical supports 54 placed beneath the same, whereby the material undergoing transference may be delivered to positions relatively remote from the machine 22.

Still another variation of my improved portable, material-transferring machine is disclosed in Figs. 10 through 12. In these figures, it will be noted that the conveyor screw shafts 27a are equipped at their rear ends with universal joints 55 driven by the motor-actuated belt wheels 33 and 34. These joints enable the conveyor screws to be angularly separated, as in Fig. 11, imparting thereby to the screws a wider gathering range than can be obtained with screws set in fixed, parallel order. Such a wide gathering range is advantageous in the handling of loose bulk materials, such as snow, sand, gravel or the like. To maintain these angularly adjustable conveyor screws in their fixed positions of adjustment, the forward ends of the shafts 27a thereof are journaled in bearings 24a depending from the underside of the frame plate 23a. The bearings 24a carry upwardly projecting threaded stems 56 which are received in arcuate slots 57 formed in the forward part of the plate 23a. Clamping nuts 58 or their equivalents are carried by the stems and are adjustable thereon for binding engagement with the plate 23a, whereby to hold the adjusted positions of the bearings 24a and the conveyor screws.

In view of the foregoing it will be seen that the material-transferring apparatus of the present invention provides a portable, self-contained, dirigible structure which need not be in any way mechanically connected with the silo or other associated housing means. The apparatus is simple, rugged and effective in performing the material-transferring operations for which it is adaptable. The apparatus may be employed for the loading or unloading of different kinds of bulk materials encountered in various agricultural or industrial activities and is not restricted to silo unloading, although it has particular application to that specific use. The machine is narrow in width to enable it to be elevated through the drop chute of a silo to its operating position and in obtaining such limited width the traction roller 43 has been placed at the rear of the machine's frame so that it does not project beyond its sides. Further, by so locating the roller the frame may be conveniently rocked by handle-applied forces about the axis of the roller to lift the front end of the machine and the conveyor screws carried thereby.

While I have described my improved material-transferring apparatus in considerable detail, and in several of its presently preferred forms, nevertheless it will be understood that such forms are but illustrative and that I reserve the right to employ all such modifications or variations thereof that may be deemed to fall fairly within the scope of the following claims.

I claim:

1. A portable machine for removing ensilage, roughage and the like from a position of storage comprising: a generally horizontally disposed box-like frame open at its bottom; a pair of horizontally and longitudinally extending conveyor screws mounted for rotation in side by side order in said frame, said screws being pitched oppositely to one another and projecting below the open bottom of said frame for direct engagement with materials to be loaded; motor-operated means carried by said frame for rotating said screws in relatively opposite directions to cause materials engaged thereby to be advanced linearly and rearwardly of the machine between the rotating screws and to impart longitudinally directed propulsive forces to said frame to move the latter relative to materials upon which said machine is positioned; a motor-driven blower mounted on said frame having a casing formed with a suction inlet and a pressure outlet, said inlet being disposed adjacent the rear ends of said screws for drawing materials advanced by the action of the screws into the blower for forcible discharge through said outlet; a discharge spout swiveled at its lower end on said outlet for turning movement thereabout; and handle means connected with said frame for guiding the latter during movement thereof.

2. A portable machine as defined in claim 1, and wherein the swiveled end of said spout is provided with an enlarged manipulating wheel disposed within the reach of an operator grasping said handle means.

3. A portable machine as defined in claim 1, and wherein a pair of oppositely rotating material penetrating and gathering devices are mounted for turning movement in unison with said screws, said gathering devices being disposed at the front of said frame in advance of said screws.

4. A portable machine as defined in claim 1, and wherein the outer edges of the conveyor screws are formed at spaced intervals with material-penetrating teeth.

5. A portable machine as defined in claim 1, wherein a single power-supplying motor is stationarily mounted on said frame rearwardly of said screws and is employed to drive both said screws and said blower.

6. A portable machine as defined in claim 1, including means connected between said frame and each of said screws providing for adjustment in the positions of said screws relative to one another.

References Cited in the file of this patent

UNITED STATES PATENTS

| | | |
|---|---|---|
| 2,634,962 | Eglitis | Apr. 14, 1953 |
| 2,677,474 | Long | May 4, 1954 |
| 2,717,812 | Eglitis | Sept. 13, 1955 |
| 2,719,058 | Van Dusen | Sept. 27, 1955 |